Figure 1:
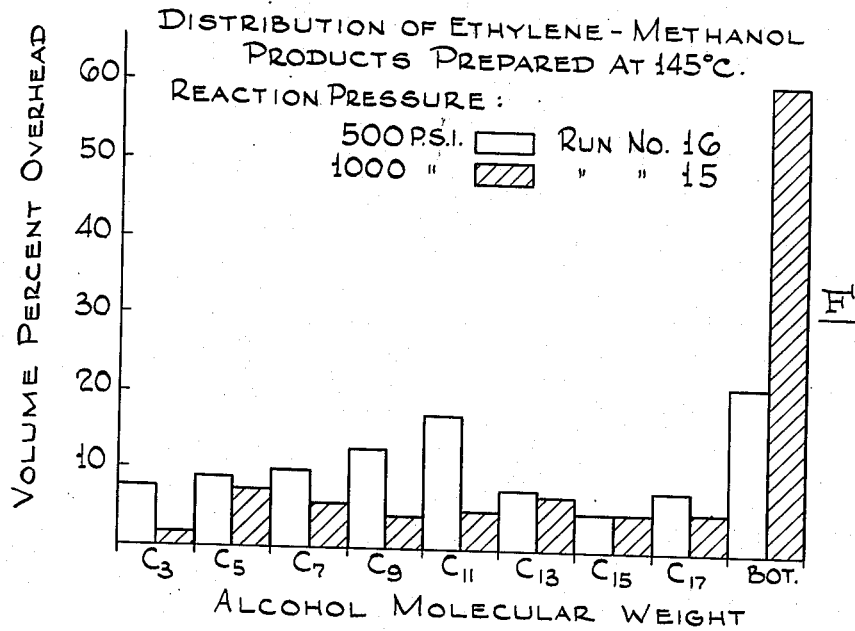

Patented Feb. 2, 1954

2,668,181

UNITED STATES PATENT OFFICE 2,668,181

PRODUCTION OF ALCOHOLS

Fred W. Banes, Westfield, William P. Fitz Gerald, Elizabeth, and Joseph F. Nelson, Rahway, N. J., and Edwin R. Gilliland, Arlington, Mass., assignors to Standard Oil Development Company, a corporation of Delaware Application December 2, 1949, Serial No. 130,784

10 Claims. (Cl. 260—642)

1

This invention relates to a new process for manufacturing alcohols of increased molecular weight by reaction between a low molecular weight olefin and a low molecular weight alcohol. In particular the invention is concerned with a novel process for producing an aliphatic or cycloaliphatic alcohol of increased molecular weight by reacting an olefin such as ethylene at comparatively low pressure with a primary or secondary aliphatic or cycloaliphatic alcohol of lower molecular weight. The final product is composed of one or more moles of the olefin hydrocarbon and one mole of the alcohol.

According to the prior art when ethylene is reacted in the presence of an oxygenated compound such as an alcohol and a peroxide catalyst at high pressures the product is a high molecular weight, solid, wax-like material. Some high molecular weight, oily polymers of ethylene have been produced in the presence of acid catalysts and catalysts of the Friedel-Crafts type.

It is an object of this invention to produce addition products of average molecular weight not above 500 from low molecular weight olefins, such as ethylene, and aliphatic or cycloaliphatic alcohols. Another object of this invention is to provide a novel process for the production of liquid addition products of an olefin and an alcohol. It is a particular object of this invention to prepare alcohols of increased molecular weight by coreaction of low molecular weight olefins, particularly ethylene, with lower molecular weight primary and secondary alcohols such as methanol, ethanol, isopropanol, etc. It is a further object of this invention to prepare novel derivatives of the above mentioned addition products.

It has been found that olefins such as ethylene can be reacted with primary and secondary aliphatic or cycloaliphatic alcohols in the presence of a peroxide type activator at comparatively low temperatures and pressures to produce an alcohol of increased molecular weight due to the incorporation therein of one or more moles of the olefin. Thus, low molecular weight alcohols of the type: $H(C_2H_4)_xCH_2OH$, where $x$ is 1 to 18, preferably 2 to 9, are produced in good yields when ethylene is reacted with methanol in the presence of a peroxide activator at 150° C. and at pressures of about 1000 p. s. i. g. for 4–5 hours.

2

Tertiary alcohols do not react to form an alcohol addition product. In their presence the olefin is converted to a hydrocarbon polymer containing only carbon and hydrogen.

Reaction conditions

The reaction between the olefin and the alcohol is carried out at temperatures in the range of room temperature to 300° C., preferably 100° C. to 250° C., and more preferably 125° C. to 200° C. Temperatures above 300° C. are to be avoided because at these higher temperatures decomposition of the peroxide activator is too rapid for greatest effectiveness to be realized.

The pressure at which the reaction is carried out depends upon the molecular weight of the particular product desired. Pressures between 50 p. s. i. g. and 2500 p. s. i. g., preferably 250–1500 p. s. i. g. are employed. For example, to produce an average $C_{12}$ alcohol from ethylene and isopropanol pressures of about 500 to 1000 p s. i. g. are found to be desirable. Uniform pressure is maintained by continuous addition of the olefin to the reaction zone.

Although there is considerable leeway in the amount of alcohol employed, it is preferred that 1 to 5 parts by weight of alcohol be used per part of olefin charged to the reactor. Broadly, molar ratios of alcohol to olefin of from 1:1 to 40:1 may be employed.

Peroxide activator

Peroxides or hydroperoxides are employed as activators for the reaction and the temperature of the reaction will depend to some extent upon the particular peroxide employed. Temperatures in the range of 50–250° C. have been found suitable. For example, one can operate in the range of 50–150° C. with activators such as t-butyl hydroperoxide and benzoyl peroxide, and at 125–250° C. with materials such as cumene hydroperoxide and di-t-butyl peroxide. Generally a total of 0.01 to 0.5 part of activator is employed per part of olefin charged to the reactor. The amount of activator employed depends on several factors among which are molecular weight of product desired and method of activator addition to the reaction. When operating a batch process it is preferred that the activator be added in increments to the reactor since in this manner the reaction proceeds more uniformly and better reaction rates and more uniform products are obtained. Suitable peroxides are di-t-butyl peroxide, t-butyl hydroperoxide, benzoyl peroxide, cumene hydroperoxide, hydrogen peroxide, t-butyl perbenzoate, di-t-butyl perphthalate or peradipate, acetyl peroxide, urea peroxide, or mixtures of two or more of the same.

Comparative data relating to some of these peroxides are presented in the following Table I.

TABLE I
SYSTEM 3 l. Autoclave.
Pressure: 1,000#.
Temperature: 145° C.
Time: 5 Hours.
60 g. peroxide used (12 g. added initially and 12 g. at 1, 2, 3 and 4 hours).
1,800 ml. absolute ethanol.

Peroxide

|  | di-t-butyl peroxide | | t-butyl hydroperoxide | | cumene hydroperoxide |
| --- | --- | --- | --- | --- | --- |
|  | 1a | 2 | 3b | 4 | 5 |
| Yield (g.) of Product Alcohol | 563 | 450 | 300 | 340 | 430 |
| Avg. Mol Wt. of Prod | 177 | 275 | 157 | 296 | 313 |
| Product Distrib. (Vol. percent): | | | | | |
| B. Pt.— | | | | | |
| 90–200° C | 53 | 22.0 | 60 | 34.0 | 29.0 |
| 200–340° C | 36 | 36.5 | 24 | 27.0 | 21.0 |
| >340° C | 11 | 41.5 | 16 | 39.0 | 50.0 | a = Run made at 750# and 166° C.
b = Run made at 500# and 145° C.

The following data have been obtained relating to the use of hydrogen peroxide as an activator. In one case 900 ml. of 90% isopropyl alcohol and 35 cc. of 30% $H_2O_2$ were added to a 1.8 liter bomb and reacted with ethylene at 800–900# pressure for 4 hours at 150° C. Ninety grams of product was recovered boiling above 90° C. and according to infrared analysis the product was a mixture of tertiary alcohols. The average molecular weight of the product was 204.

In another experiment 1800 ml. of 99% isopropyl alcohol and 30 ml. of 30% $H_2O_2$ were added to a 3-liter autoclave. Ethylene was admitted to the reactor to give a pressure of about 200# whereupon the reactor and contents were heated to 160° C. Additional ethylene was then added to give a pressure of 1000# and this pressure was maintained throughout the run. At the end of 1, 2 and 3 hours, after reaching 160° C., 30 cc. batches of 30% $H_2O_2$ were added to the reactor and a final quantity of 6 cc. was added at the end of hour 4. At the end of hour 5 the reactor and contents were cooled to 35° C. and the reaction product removed from the reactor. After stripping unreacted isopropanol from the product solution, 192 gms. of liquid product were recovered. This product had an average molecular weight of 312 and gave the following distribution of alcohol product:

| | Vol. percent overhead |
| --- | --- |
| 90–200° C | 43 |
| 200–340° C | 20 |
| >340° C | 37 |

Reaction mechanism

It is believed that the peroxide serves as an activator for the alcohol molecules by detaching a hydrogen atom therefrom and producing a radical of the type:

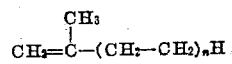

where $R_1$ and $R_2$ represent hydrogen atoms, alkyl or cycloalkyl groups. This radical in turn initiates and sustains reaction by a chain transfer mechanism.

It has been found that in order to realize maximum effectiveness from the peroxide activator it should preferably be aged with the alcohol reactant at a temperature at which it displays an intermediate decomposition rate before the solution is added to the hot reaction mixture.

The alcohols formed in the above manner are essentially compounds of the type:

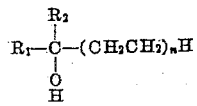

where $R_1$ and $R_2$ represent hydrogen atoms, alkyl or cycloalkyl groups, and where $n$ varies from 1 to about 16, but predominantly is in the range of 3 to 12. Thus, if isopropyl alcohol is employed, 50 to 80% or more of the alcohol product falls in the $C_{10}$ to $C_{20}$ molecular weight range. These products can then be easily dehydrated to give olefins of the structure:

$$CH_2=C(CH_3)-(CH_2-CH_2)_nH$$

The specificity of the above reaction can be readily demonstrated since no alcohol except isopropyl alcohol can be used in the coreaction with ethylene to give a product which on dehydration yields 2-methyl-1-alkenes as the predominant product.

Reactants

Normally gaseous mono-olefins such as ethylene, propylene, the butylenes, pentenes, etc. are the preferred olefin reactants, although the higher molecular weight olefins which are liquids may also be employed. Diolefins such as butadiene, isoprene, etc. are also reactive although they yield a variety of reaction products due to the reactivity of the multiple double bonds and are not preferred materials. Mixtures of olefins such as ethylene and propylene can also be employed. The olefin need not be pure. High percentages of saturates may be present, but provision should be made for bleeding them off from the system during the reaction.

Nature of product

Although it has been known for some time that olefins such as ethylene may be converted by the action of peroxide and under the influence of heat and extremely high pressure to solid polymers and interpolymers of very high molecular weight, it has not been recognized prior to this invention that specific alcohol products may be produced from ethylene and primary and secondary alcohols by choosing a proper and specific combination of reaction conditions and reactants. By the use of specific reactants and reaction conditions high yields of low molecular weight condensation products (averaging 3–35 carbon atoms) containing a hydroxyl group in the hydrocarbon chain can be produced. For example, by reacting ethylene and a secondary alcohol such as isopropanol a product of type:

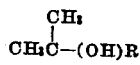

is obtained where R is an alkyl group predominantly of linear structure.

Of the alcohols, primary and secondary alcohols exhibit high reactivity with ethylene under the condtions specified and give rise to the formation of highly useful acohols of increased molecular weight. Experimental data indicate that alcohol reactants may be ranked roughly in order of decreasing reactivity as follows: isopropanol, ethanol, sec-butanol, methanol, and cyclohexanol. Tertiary alcohols are excluded from the scope of this invention as inoperative for the reasons previously assigned. The products exhibit strong infrared absorption at 3.0 microns indicating high concentrations of hydroxyl groups. Their very low bromine numbers indicate that the compounds were practically completely saturated.

A fraction of a product made from the coreaction of ethylene and isopropanol boiling in the range of 75–105° C. at 5 mm. Hg contained by analysis 75.45% carbon, 14.42% hydrogen, and 10.13% oxygen. The material, a water-white liquid, was further characterized as follows: molecular weight 152, sp. gr. 0.811, and refractive index 1.4340. Infrared spectrum analysis disclosed the presence of a high concentration of OH groups by the strong absorption at 3.0 microns. Absorptions at 8.4–8.6 microns indicated that these groups were in a tertiary configuration. The almost complete lack of unsaturation was evidenced by a bromine number of 2.48 and the weak absorption of the spectrum at 6.05 microns.

It was concluded that this product had an average composition of $C_{10}H_{22}O$, and is a mixture of tertiary $C_9$ and $C_{11}$ alcohols.

Upon dehydration of this same alcohol fraction over aluminum oxide at 320° C. an olefin was produced having a molecular weight of 135 and a bromine number of 109. Infrared absorption at 11.25 microns indicates that the dehydration product is an olefin of the average structure:

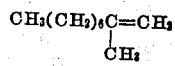

These data indicate that the fraction evaluated was a mixture of 2-methyl octanol-2 and 2-methyl decanol-2 and that the dehydration product was a mixture of 2-methyl-octene-1 and 2-methyl-decene-1.

When a product synthesized from ethylene and methanol was subjected to infrared scanning, absorption at 3.0 microns indicated the presence of hydroxyl groups, and absorption in the vicinity of 9.5 indicated primary configuration. The dehydrated product showed absorption at 10.25 indicating an olefin of the structure:

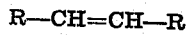

Although primary alcohols should theoretically give olefins of the structure:

the dehydration temperature was high enough to induce isomerization, and this apparently does occur.

*Experimental data*

Typical data relating to several types of ethylene-alcohol products are given in the following Table II.

TABLE II

*Synthesis and properties of ethylene—alcohol products*

| Run No. | Diluent | | DTBP [1] (gms.) | Reaction Conditions [2] | | Product Yield [3] | | |
|---|---|---|---|---|---|---|---|---|
| | Type | Vol. (ml.) | | Pressure (p. s. i.) | Temp. (° C.) | Gms. | Gm.P/ Gm. A. | M. P./ M. A. |
| 1 | iC$_3$H$_7$OH | 1,800 | 59.5 | 1,000 | 146 | 750 | 12.6 | 6.5 |
| 2 | iC$_3$H$_7$OH | 1,800 | 59.5 | 500 | 146 | 590 | 9.9 | 9.1 |
| 3 | sC$_4$H$_9$OH | 1,800 | 59.5 | 1,000 | 146 | 650 | 11.0 | 5.3 |
| 4 | tC$_4$H$_9$OH | 1,040 | 59.5 | 1,000 | 145 | 180 | 3.0 | |
| 5 | Cyclohexanol | 1,040 | 59.5 | 1,000 | 145 | 435 | 7.3 | |
| 6 | C$_2$H$_5$OH | 1,800 | 59.5 | 1,500 | 145 | 806 | 13.5 | 4.6 |
| 7 | C$_2$H$_5$OH | 1,800 | 59.5 | 1,000 | 166 | 638 | 11.7 | 6.2 |
| 8 | C$_2$H$_5$OH | 1,800 | 59.5 | 1,000 | 145 | 517 | 8.7 | 4.6 |
| 9 | C$_2$H$_5$OH | 1,800 | 59.5 | 750 | 145 | 410 | 6.9 | 4.8 |
| 10 | C$_2$H$_5$OH | 1,800 | 59.5 | 750 | 125 | 278 | 4.7 | 2.0 |
| 11 | C$_2$H$_5$OH | 1,800 | 59.5 | 500 | 145 | 315 | 5.3 | 5.5 |
| 12 | C$_2$H$_5$OH | 1,800 | 59.5 | 250 | 145 | 220 | 3.7 | 4.5 |
| 13 | C$_2$H$_5$OH | 1,800 | 40.0 | 1,000 | 145 | 340 | 8.5 | 4.3 |
| 14 | C$_2$H$_5$OH | 1,040 | 59.5 | 1,000 | 145 | 525 | 8.8 | (4.3) |
| 15 | CH$_3$OH | 1,800 | 59.5 | 1,000 | 166 | 347 | 5.8 | 2.4 |
| 16 | CH$_3$OH | 1,800 | 59.5 | 500 | 145 | 165 | 2.8 | 2.3 |
| 17 | t-C$_4$H$_9$OH | | 59.5 | 1,000 | 145 | 548 | 9.2 | |
| 18 | 2-Me-2-C$_4$H$_9$OH | | 59.5 | 1,000 | 145 | 614 | 10.3 | |

[1] DTBP—di-t-butylperoxide.
[2] Reaction time—5 hours.
[3] Gm. P./Gm. A.= Grams product per gram of DTBP; M. P./M. A.=Moles product per mole of DTBP.

TABLE II—Continued

| Run No. | Polymer Distribution by Distillation (Vol. Percent Overhead)[4] | | | Product Analyses | | | |
|---|---|---|---|---|---|---|---|
| | <200° C. | 200–340° C. | >340° C. | Acetyl No. (c. eq./g.) | Molecular Wt.[6] | Percent Alcohol (by wt.) | Alcohol Type (Infra-Red) |
| 1 | 34.5 | 29.0 | 36.5 | | 285 | [5]90–100 | tertiary. |
| 2 | 55.0 | 25.0 | 20.0 | | 160 | [5]90–100 | Do. |
| 3 | 14.5 | 26.0 | 59.5 | | 300 | [5]90–100 | Do. |
| 4 | | | | | 350 | 0 | Hydrocarbon polymer prod. |
| 5 | (10.0) | (48.0) | (42.0) | | 350 | | tertiary. |
| 6 | 15.0 | 22.5 | 62.5 | 0.218 | 430 | 93.8 | sec. and tertiary. |
| 7 | 33.5 | 34.0 | 32.5 | 0.357 | 252 | 90.0 | Do. |
| 8 | 32.0 | 30.0 | 38.0 | 0.329 | 275 | 90.5 | Do. |
| 9 | 44.0 | 30.0 | 26.0 | 0.406 | 210 | 85.2 | Do. |
| 10 | 18.9 | 36.9 | 44.2 | 0.289 | 337 | 97.2 | Do. |
| 11 | 62.5 | 26.5 | 11.0 | 0.654 | 140 | 91.5 | Do. |
| 12 | 93.5 | 6.5 | 0.0 | 0.710 | 110 | 79.5 | Do. |
| 13 | 22.2 | 33.8 | 44.0 | 0.311 | 289 | 90.0 | Do. |
| 14 | 18.0 | 31.0 | 51.0 | | (300) | | |
| 15 | 14.2 | 31.3 | 55.5 | 0.270 | 355 | 96.0 | primary |
| 16 | 33.5 | 36.5 | 30.0 | 0.543 | 175 | 95.0 | Do. |
| 17 | 0 | 12.0 | 88.0 | | >500 | 0 | hydrocarbon polymer prod. |
| 18 | 0 | 12.0 | 88.0 | | >500 | 0 | Do. |

[4] 200° C. = $C_3$ to $C_9$ product alcohols; 200–340° C. = $C_{10}$ to $C_{16}$ alcohols; 340° C. = $C_{17}$+ alcohols.
[5] Estimated from infra-red absorption data.
[6] Average molecular weight calculated from viscosity data.

Figure 2:
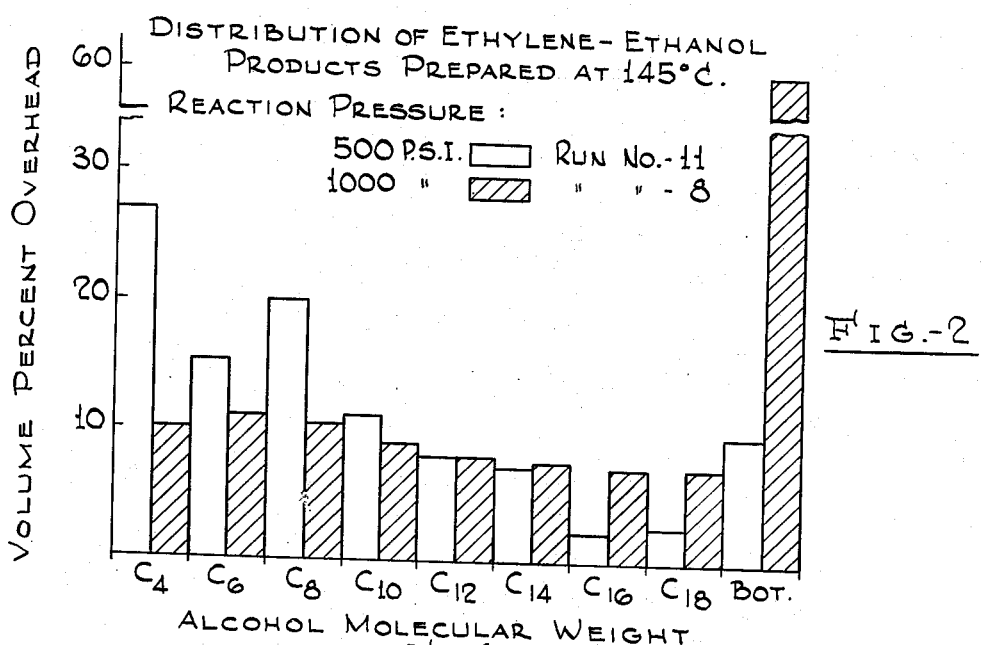
Figure 3:
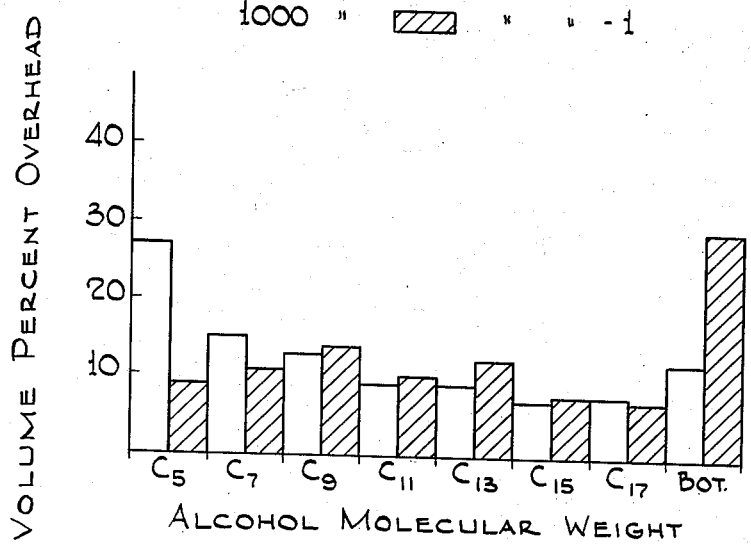

Product distribution data for the methanol, ethanol, and isopropanol systems at 500 and 1000 p. s. i. g. are shown in the bar graphs of Figures 1, 2 and 3 respectively. The run numbers indicated in each of the figures correspond to the runs tabulated in Table II. The graphs show the relationship of the volume percent of product distilled versus the molecular weight of the alcohol product. These products were prepared in the 3-liter turbo unit during a 5 hour run in which the incremental peroxide addition technique was employed.

Runs 17 and 18 employing tertiary alcohols were carried out in a 3-liter autoclave at 1000 p. s. i. g.; the temperature was maintained at approximately 145° C. and the run lasted approximately 5 hours. Di-t-butyl peroxide was employed as a catalyst. Analysis of the products showed that they were higher in molecular weight than products obtained with other alcohols and according to both spectroscopic data and elemental analysis contained neither combined oxygen nor hydroxyl groups. The analysis shows that the products consist entirely of carbon and hydrogen and are undoubtedly high molecular weight ethylene polymers.

Reactions with other olefins

A number of runs were made in which propylene was reacted with alcohols. It will be noted that the yields were lower than with ethylene but the products are analogous to those produced from ethylene. Certain of these data are given below:

| Olefin | Co-Reactant | Pressure (p. s. i.) | Temp. (° C.) | Yield (Percent on Olefin) |
|---|---|---|---|---|
| Propylene | Isopropanol | 650 | 150 | 13.5 of alcohol. |
| | Methanol | 1,010 | 150 | 7.5 of alcohol. |

The distribution of products from a typical propylene-isopropanol reaction is given below:

| B. Pt. of Cut (° C.) | 80–180 | 180–220 | 220–270 | 270–330 |
|---|---|---|---|---|
| Vol. Percent | 20 | 30 | 25 | 25 |
| Avg. Mol. Wt. of Fraction | 134 | 173 | 219 | 276 |

Reactions were also carried out with isopropanol and mixtures of ethylene and propylene as the olefin feed. In these cases the yields were somewhat higher than with propylene alone and again the products were predominantly alcohols.

Isobutylene also reacts but at a slower rate and with lower yields than obtained with ethylene. The following run is typical.

Isobutylene (400 ml.), isopropanol (900 ml.) and di-t-butyl peroxide (15 ml.) were added to a 1.8-liter bomb and heated with agitation at 150° C. for 5 hours. When the unreacted olefin and alcohol had been removed from the reaction product, 72 ml. of product was recovered boiling above 100° C. About 25 ml. of this product boiled at 133–4° C. and, according to infrared analysis, was a tertiary alcohol. When the 133–4° C. cut was dehydrated over alumina at 325° C., an olefin was recovered having a boiling point of 82–3° C. These data indicate that the product was the $C_7$ alcohol, 2,4-dimethyl-2-pentanol. Approximately 20 vol. percent of the product boiled in the 190–200° C. range and were determined to be predominantly $C_{11}$ tertiary alcohols. These alcohols dehydrated to a product boiling in the range of 165–170° C. which is in accord with reported data for $C_{11}$ olefins.

From experimental data it has been observed that variations in temperature and pressure have a distinct effect upon the molecular weight of the resulting product. At constant temperature, for example 145° C., and increasing pressures, from 250 to 1500 p. s. i., the average molecular weight of the product increased respectively from 110 to 420. On the other hand at constant pressure, namely, 1000 p. s. i., average molecular weight of the product alcohols decreased from 479 to 252 as the temperature increased from 125° C. to 166° C. In all instances other reaction conditions were constant.

The reaction may be carried out batch-wise or continuously.

The invention described is applicable to the preparation of alcohols of preferably 3 to about 25 carbon atoms per molecule and more preferably 3 to about 21 carbon atoms per molecule; the number of carbon atoms in the alcohol product depending upon the alcohol and the olefin employed as the reactants. Thus, from methanol and ethylene, alcohols of 3 to 21 carbon atoms are preferably prepared; from ethanol and ethylene, alcohols of 4 to 18 carbon atoms are prepared, while from isopropanol and ethylene, alcohol products containing 5 to 19 carbon atoms per molecule are preferably obtained. Alcohols of a similar number of carbon atoms may likewise be prepared from propylene and isobutylene, etc. in place of ethylene.

What is claimed is:

1. A process for reacting an alcohol selected from the group consisting of aliphatic and cycloaliphatic primary and secondary alcohols with a low molecular weight normally gaseous mono-olefin hydrocarbon in the presence of a peroxide activator selected from the group consisting of ditertiary butyl peroxide and tertiary butyl hydroperoxide at a temperature of 100° C. to 250° C. for a period of one to five hours and at a pressure between 250 and 1500 p. s. i. g., and recovering from the reaction a mixture of alcohols of increased molecular weight up to about 300.

2. A process for reacting ethanol with ethylene in the presence of tertiary butyl hydroperoxide at a temperature of 100° C. to 250° C. for a period of one to five hours and at a pressure of 250 to 1500 p. s. i. g., and recovering from the reaction a mixture of aliphatic alcohols containing 4 to 18 carbon atoms per molecule and selected from the group consisting of secondary and tertiary aliphatic alcohols.

3. The process defined in claim 1, wherein the alcohol and the mono-olefin hydrocarbon are ethanol and ethylene, and wherein the peroxide activator is di-t-butyl peroxide.

4. The process defined in claim 1, wherein the alcohol and the mono-olefin hydrocarbon are methanol and ethylene, and wherein the peroxide activator is di-t-butyl peroxide.

5. The process defined in claim 1 wherein the alcohol and the mono-olefin hydrocarbon are isopropanol and ethylene, and wherein the peroxide activator is di-t-butyl peroxide.

6. A process for reacting an alcohol selected from the group consisting of aliphatic and cycloaliphatic primary and secondary alcohols with ethylene in the presence of a peroxide activator selected from the group consisting of ditertiary butyl peroxide and tertiary butyl hydroperoxide at a temperature of 100° C. to 250° C. and at a pressure of 250 to 1500 p. s. i. g., for a period of 1 to 5 hours and recovering from the reaction a mixture of alcohols of increased molecular weight up to about 300.

7. A process for reacting a primary aliphatic alcohol containing from 1 to 5 carbon atoms per molecule with ethylene in the presence of a peroxide activator selected from the group consisting of ditertiary butyl peroxide and tertiary butyl hydroperoxide at a temperature of 100° C. to 250° C. for a period of 1 to 5 hours and at a pressure of 250 to 1500 p. s. i. g., and recovering from the reaction a mixture of alcohols containing 3 to 18 carbon atoms per molecule.

8. A process for reacting a secondary aliphatic alcohol containing from 3 to 5 carbon atoms per molecule with ethylene in the presence of a peroxide activator selected from the group consisting of ditertiary butyl peroxide and tertiary butyl hydroperoxide at a temperature of 100° C. to 250° C. for a period of 1 to 5 hours and at a pressure of 250 to 1500 p. s. i. g., and recovering from the reaction a mixture of tertiary alcohols containing 5 to 18 carbon atoms per molecule.

9. A process for reacting a primary aliphatic alcohol containing from 1 to 5 carbon atoms per molecule with propylene in the presence of a peroxide activator selected from the group consisting of ditertiary butyl peroxide and tertiary butyl hydroperoxide at a temperature of 100° C. to 250° C. for a period of 1 to 5 hours and at a pressure of 250 to 1500 p. s. i. g., and recovering from the reaction a mixture of alcohols containing 4 to 18 carbon atoms per molecule.

10. A process for reacting a secondary aliphatic alcohol containing from 3 to 5 carbon atoms per molecule with propylene in the presence of a peroxide activator selected from the group consisting of ditertiary butyl peroxide and tertiary butyl hydroperoxide at a temperature of 100° C. to 250° C. for a period of 1 to 5 hours and at a pressure of 250 to 1500 p. s. i. g., and recovering from the reaction a mixture of tertiary alcohols containing 6 to 18 carbon atoms per molecule.

FRED W. BANES.
WILLIAM P. FITZ GERALD.
JOSEPH F. NELSON.
EDWIN R. GILLILAND.

References Cited in the file of this patent

UNITED STATES PATENTS

| Number | Name | Date |
|---|---|---|
| 2,402,137 | Hanford et al. | June 18, 1946 |
| 2,517,732 | Stiteler et al. | Aug. 8, 1950 |